Nov. 12, 1963 H. C. CAMPBELL 3,110,477
TREE OR POST PULLER APPARATUS
Filed Feb. 13, 1961 2 Sheets-Sheet 1

INVENTOR.
HOMER C. CAMPBELL
BY McGrew & Edwards
ATTORNEYS

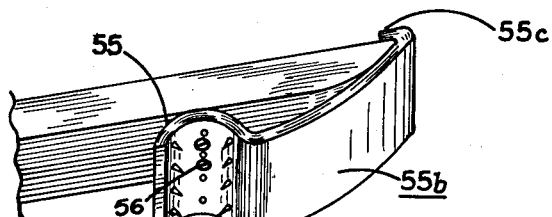
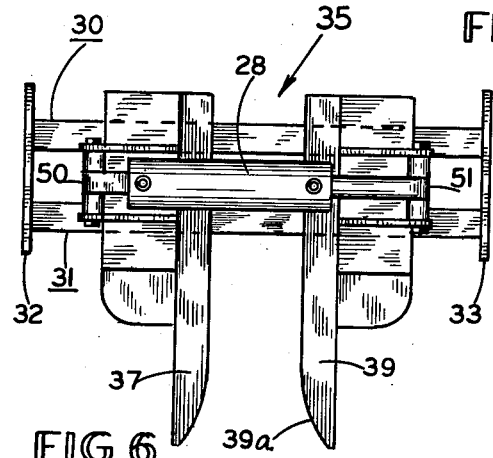
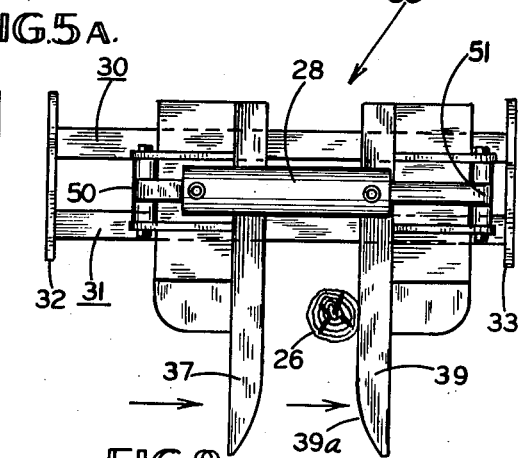
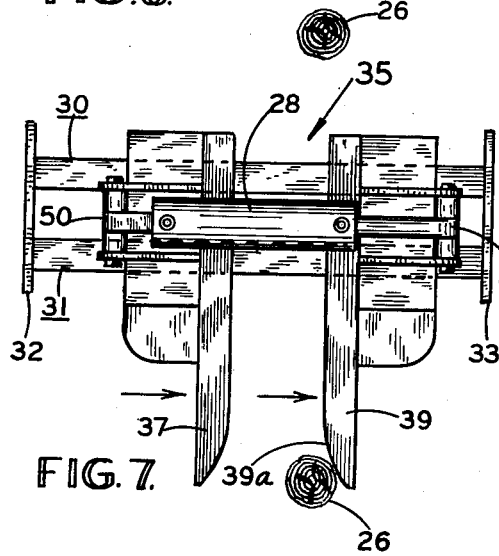
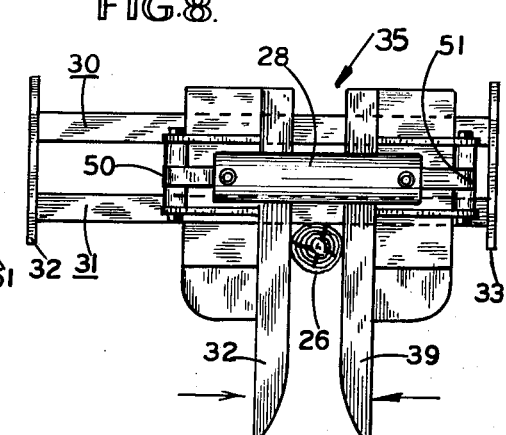
INVENTOR.
HOMER C. CAMPBELL
ATTORNEYS United States Patent Office 3,110,477
Patented Nov. 12, 1963

3,110,477
TREE OR POST PULLER APPARATUS
Homer C. Campbell, 1290 Ivanhoe St., Denver, Colo., assignor of one-half to George A. Hill, La Junta, Colo.
Filed Feb. 13, 1961, Ser. No. 88,989
9 Claims. (Cl. 254—132)

This invention relates to new and useful improvements in tree or post pullers, and more particularly to improvements in tree or post puller apparatus adapted for selective attachment to movable boom members of the type normally mounted on and operated by bulldozers, tractors and other prime movers.

There are many devices known in the art for grubbing, clearing and pulling trees, bushes and posts in ground leveling operations, etc.; and some have been suggested for selective attachment to movable boom members mounted on any of a variety of different types of prime movers. However, practically all of the prior art arrangements have included complicated cable, chain and multiple linkage mounting systems for operation. Also, most of them have required more than one operator when used. Some such devices have had a substantially centrally located jaw adapted for scissor-like action in initial tree gripping or include a plurality of plates, etc., which are put in place around the trunk of a tree or a post body after the prime mover is moved thereadjacent.

My invention is a distinct departure from such arrangements. It is very simple in construction, has few moving parts and is very easily used by a single operator with a minimum of instruction in its use.

Briefly, apparatus according to my invention is comprised essentially of main elongated support members adapted to be mounted or attached selectively to parallel boom members of the type normally found on bulldozers and other prime movers. Gripping structure is mounted on the support members and arranged for free sliding movement thereover. A pair of substantially parallel jaws extend forwardly from the gripping structure and are interconnected across rear portions by a double acting hydraulic cylinder. In operation, a user merely moves the prime mover toward a post, etc., to be pulled. The spaced apart jaw members upon initial contact with the post float or freely slide over the support members, thereby automatically positioning the post between the jaws without the necessity of apparatus actuation or operator command. When the post is positioned between the jaws, the double acting cylinder causes them to move toward each other in a closing action. During the closing action substantially no pressure is applied by either jaw to the post to be pulled, but rather the jaws and the gripping structure with which they are associated are caused to float or move freely over the elongated support members until the post is centered and each jaw is applying some pressure to opposed sides of the post. Continued application of pressure through the hydraulic cylinder to the jaw members causes them to apply an equal gripping pressure against opposed sides of such a centered post. Thereafter, the boom members are actuated from the prime mover and caused to move in an upright path, thereby pulling the post or tree from the ground. Further details will be more fully explained hereafter.

It is thus among the objects and advantages of my invention to provide novel post or tree puller apparatus which is of simple construction and easily used by other than skilled persons. It is another object and advantage of my invention to provide novel post or tree puller apparatus with a minimum of control devices and which is self-centering about a post to be pulled without operator control of the said structure. It is still another object of my invention to provide novel post or tree puller apparatus which is adapted to apply even gripping pressure about posts with substantially no damage to such posts. It is still a further object of my invention to provide novel tree or post puller apparatus, inclusive of gripping structure arranged in freely sidewise slidable relation with elongated support members which are adapted for automatic centering of said gripping structure about a post to be pulled.

Other features and advantages inherent in tree or post puller apparatus according to my inventive concepts and novel interaction between parts will become readily apparent to those skilled in the art from a study of the following detailed description of the appended drawings. In the drawings:

FIG. 5 is a fragmentary perspective view of an alternative embodiment of jaws of puller apparatus according to my invention;

FIG. 5a is a fragmentary top view of a portion of the apparatus of FIG. 5; and

FIGS. 6–9 are schematic views of sequential stages of operation and illustrating automatic centering features of puller apparatus according to my invention.

Before describing the drawings in detail, I wish it understood that they are but exemplary of possible arrangements embodying my inventive concepts and that the true measure of my invention is to be as defined in the appended claims.

Figure 1:
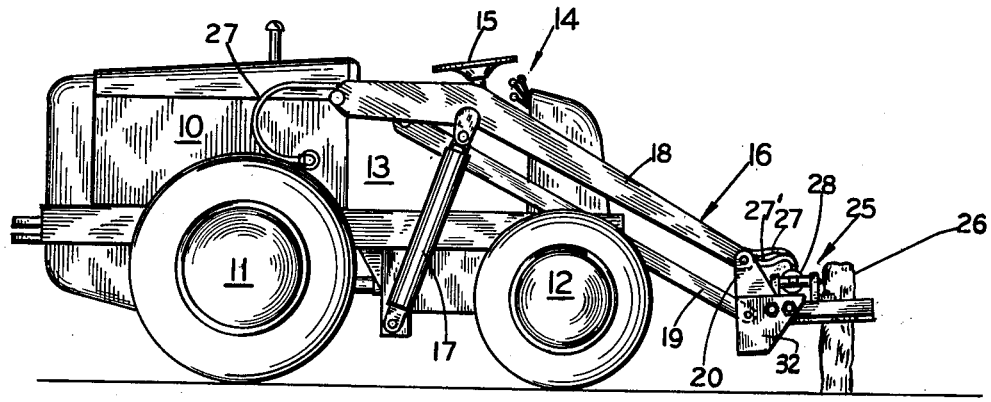
FIG. 1 is a side elevation of a prime mover having tree or post puller apparatus according to my invention mounted at the forward end of vertically movable boom members and showing the foregoing in position for pulling a post.
Figure 3:
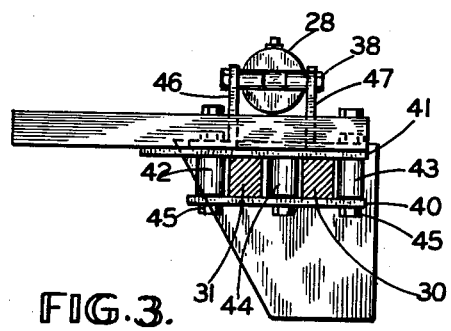
FIG. 3 is a side elevation in partial section and on an enlarged scale of the gripping structure and mounting arrangement of the post puller apparatus of FIG. 1.

Apparatus according to my concepts is particularly adapted for attachment to self-propelled prime movers which may be of the type shown in FIG. 1, comprised essentially of a main vehicle body 10 carried on spaced apart sets of wheels 11 and 12, and housing an engine, a central hydraulic system, an operator compartment 13 with hydraulic controls 14 and a steering wheel 15 arranged within easy reach of an operator, and having forwardly extending movable boom structure 16. The engine and central hydraulic system of such a prime mover have not been shown in the drawings and detailed discussion relative to them is believed unnecessary since they may be any of those well known in the art and are not, per se, a part of my invention.

The boom structure 16, at operator command, is caused to rise and fall through an upright path under influence of extensible hydraulic cylinder 17, and is comprised essentially of elongated boom members, such as 18 and 19 in FIG. 1, mounted on either side of the vehicle body 10 and extending forwardly thereof. Attached across forward terminal portions of the boom members 18 and 19 is a common pivot plate 20 which interconnects them but allows some relative movement therebetween in order to compensate for changes in effective length during rise and fall. By changes in effective length, I mean that, since the rear portions of the boom members 18 and 19 are fixed relative to the vehicle body 10, as they rise and fall their forward ends will move slightly relative to each other during movement through said upright path.

Post or tree puller apparatus 25 embodying my inventive concepts is releasably attached to the foregoing boom structure and, in FIG. 1, is shown in gripping position relative to a post 26. Hydraulic conduits 27 and 27' interconnect the double action hydraulic cylinder 28 of puller apparatus 25 with the central control system of the prime mover and is arranged for operation and command by one of the controls 14. The hydraulic conduits 27 and 27' are the sole operator commanded interconnection between the prime mover and operating structure of the puller apparatus 25.

Figure 2:
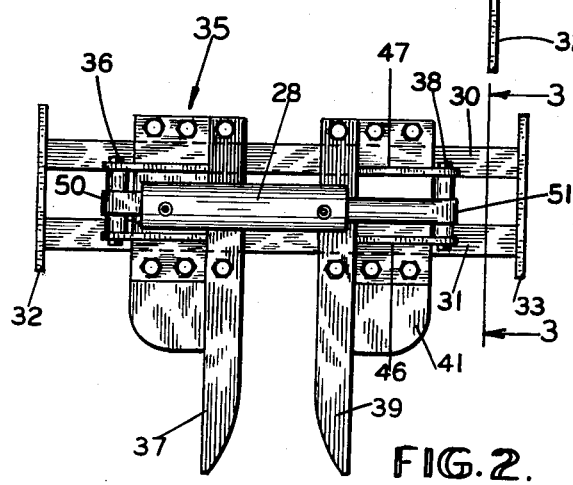
FIG. 2 is a top plan view of the tree or post puller apparatus of FIG. 1.

Referring to FIG. 2, puller apparatus 25 is comprised of a pair of spaced apart, substantially parallel support bars 30 and 31 mounted at right angles to and between upright substantially parallel plates 32 and 33. The foregoing comprises the main support means of the apparatus 25. The plates 32 and 33 are adapted for selective rigid attachment to respective spaced apart pivot plates 20 of the boom structure 16 and are arranged to maintain the bars 30 and 31 substantially horizontal relative to the ground throughout operation of the puller apparatus. Gripping structure 35 is mounted in freely slidable relation with the bars 30 and 31 between the upright plates 32 and 33 and is comprised essentially of the double action hydraulic cylinder 28, one end of which is interconnected through pin 36 and related structure to one of the spaced apart parallel jaws 37. The opposite end of the double action hydraulic cylinder is connected through pin 38 and related structure to the second parallel jaw member 39. The related structure is comprised of upper and lower plates 40 and 41 separated by spacers 42, 43 and 44 and interconnected by a plurality of bolts 45. The upper surface of the plate 41 carries a pair of spaced apart L-flanges 46 and 47 which spatially encompass the cylinder 28 and through which is threaded the pin 38. The related structure of both jaws is the same. The openings defined by such related structure between the spacers 42, 43 and 44 encompass the bars 30 and 31 and maintain the jaws perpendicular to the bars and substantially horizontal to the ground.

Figure 4:
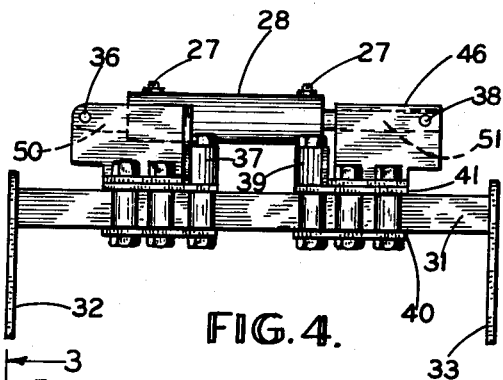
FIG. 4 is a front elevation of the puller apparatus of FIG. 1.

In my preferred arrangement, the end 50 of the cylinder 28 is of fixed length while the other end 51 is adapted to be extended and retracted (see FIG. 4). Thus, when the pressure through conduits 27 and 27' is held constant, the spacing of the jaw 37 relative to jaw 39 remains constant and they move as a unit with the cylinder 28 and the related parts of the gripping structure across the parallel bars 31 and 32. Upon actuation of the cylinder through the conduits 27 and 27', the jaws are caused to move toward and away from each other as desired.

FIG. 5 is illustrative of an arrangement I prefer when wooden posts or the like are to be pulled and is comprised of an auxiliary gripping member 55 which is adapted to be selectively mounted on one of the jaws 55a by such as spaced apart screws 56. The plates 55 preferably include an outwardly opening concave portion adapted to directly oppose a similar concave portion of a similar gripping member mounted on an opposite jaw. Since the plates 55 are of substantially greater length than the width or thickness of the jaw 55a, there is provision for more even application of gripping pressure over a greater longitudinal extent of a post being pulled, thereby overcoming the tendency of such as wooden posts to break or be deformed when gripped by the jaws. The forward portion 55b carries an integral ear 55c which is adapted to cooperate with screws 56 to hold the plate in place. Also, the outward slope of portion 55b assists initial post encompassment. Preferably, I include a plurality of longitudinally spaced prongs 57 along the surface of the plate which are adapted to engage the material from which the post is fabricated.

FIGS. 6 through 9 are indicative of possible sequential stages of operation of post puller apparatus according to my invention. The drawings are schematic, merely showing sufficient apparatus elements to identify the structure relative to the more detailed showing of the earlier figures. In FIG. 6 the elements of the gripping structure 35 are in fixed relation relative to each other, i.e., the hydraulic cylinder 28 has its extensible portion 51 at a fixed length; and thus the spacing between the jaws 37 and 39 remains constant. As the prime mover carrying the apparatus 25 approaches a post 26, the jaws are preferably spaced at substantially their maximum distance from each other. When the forward end—or any portion for that matter—of one of the jaws contacts the post 26, the entire gripping structure 35 freely slides on the bars 31 and 32. The arrows in FIG. 7 indicate the direction of movement of the structure which results from the post 26 camming over the internal surface area 39a of the jaw 39.

Further forward motion of the prime mover causes the jaws 37 and 39 to encompass the post 26 and causes further movement to the right of the gripping structure as viewed in FIG. 8. Subsequent actuation of the hydraulic cylinder 28 causing the jaws 37 and 39 to move toward each other, as shown in FIG. 9, results in a centering of the post 26 between the jaws. Until such time as each jaw bears against an opposed side of the post and exerts some pressure thereagainst, there is no gripping of the post since the entire gripping structure 35 floats, or moves, on the bars 31 and 32 because of application of pressure by only one of the jaws.

Summarizing the operation of post puller apparatus according to my invention, a single operator through use of suitable control means causes the parallel jaws 37 and 39 to move and be held in their most spaced apart position. Forward movement of the prime mover toward a post with roughly aligned centering of the post relative to the jaws is all the operator control necessary until such time as either jaw contacts the post. Upon initial contact by interior surface portions of either of the jaws, the entire gripping structure—of which the jaws are a portion—is caused to move sidewise in freely slidable relation with the bars 31 and 32 until a post is encompassed within the jaws. Application of hydraulic pressure to actuate the double acting hydraulic cylinder 28 causes the jaws to move toward each other and, together with the above noted freely slidable relationship between the gripping structure and the bars 31 and 32, the jaws are brought into equalized gripping engagement with opposed surfaces of the post. By suitable manipulation of other controls, the boom members are caused to move in an upright path, thereby pulling the post from the ground.

Having thus described my invention with sufficient particularity as to enable those skilled in the art to practice it, what I desire to have protected by Letters Patent is as follows.

I claim:

1. Tree or post puller apparatus adapted to be selectively mounted on spaced apart vertically swingable hydraulically actuated parallel boom members interconnected with a central hydraulic system of a tractor or the like, comprising elongated support means mounted between spaced apart substantially parallel upright plate members adapted to be selectively mounted on respective spaced apart boom members, there being gripping structure mounted on said support means for sidewise slidable floating relation therewith, including spaced apart parallel jaw members, a double action hydraulic cylinder interconnecting said jaw members, said jaw members having outwardly flared end portions extending forwardly from said support member substantially perpendicular thereto and being held thereby substantially horizontal to the ground, whereby said gripping structure is free to slidably float sidewise on the support means upon contact between the flared end portion of either jaw member and a post to be pulled, and said hydraulic cylinder adapted to close the jaw members at a uniform rate for equalized gripping of a said post.

2. The apparatus of claim 1 in which the double action hydraulic cylinder is interconnected with said central hydraulic system and adapted for actuation from said tractor.

3. In tree or post puller apparatus adapted for attachment to lifting means on a prime mover, the improvement comprising support means held by said lifting means in a substantially horizontal position, a pair of elongated forwardly extending jaw members mounted for free sliding movement on said support means, power-actuated mechanism for moving said jaw members toward and away from each other including means for holding said jaws spaced apart during sliding movements thereof, said means for actuating said power-actuated mechanism adapted to move said jaw members toward each other with said jaw members sliding on said support means so as to center on an object therebetween until both jaws contact the object and thereafter apply equal pressure against opposed portions of the object, and said means for actuating said mechanism adapted to apply gripping movement to said jaw members during lifting thereof.

4. The apparatus of claim 3 in which the support means includes at least a pair of parallel spaced bars of substantially uniform length.

5. The apparatus of claim 3 in which the jaw members are mounted generally parallel and are arranged for movement toward and away from each other.

6. In tree or post puller apparatus adapted for attachment to a prime mover having lifting structure, the improvement comprising elongated support means interconnected with the lifting structure of the prime mover and adapted to maintain said support means substantially horizontal during operation, interconnecting mechanism freely slidably mounted on said support means, a pair of elongated jaw members mounted on said interconnecting means and slidable with said interconnecting mechanism, said jaw members including outwardly flared portions extending a substantial distance beyond the support means, said flared portions providing contact surfaces for moving said jaw members on said support member when contacted by a post therebetween, means connected with said interconnecting mechanism for moving said jaw members toward and away from each other through a common plane on said support means whereby said jaw members close while sliding with said interconnecting mechanism until said jaws center on a post therebetween, said means arranged to move said jaws into equalized gripping with opposed portions of said post, and said means arranged to hold said jaws in post-gripping position during movement of the lifting structure so as to pull the post therebetween.

7. In tree or post puller attachments for prime movers having lifting structure, the improvement comprising an elongated support member mounted on the lifting structure of a prime mover and arranged to be maintained substantially horizontal during operation, a pair of spaced-apart parallel jaw members freely slidably mounted on said support member, a double action hydraulic cylinder connected adjacent the rear portions of the jaw members, the forward portions of the jaws extending a distance forward of said support member and including outwardly flared portions whereby said jaw members freely slide on said support member when one said jaw member contacts a post to center said jaw members on the post, means for actuating said cylinder to close said spaced jaws during sliding movement on said support members so as to move the other said jaw member into contact with the post and then apply equal gripping pressure on opposed portions of said post from each said jaw member.

8. In tree or post puller apparatus adapted for selective attachment to lifting means carried on a prime mover, the improvement comprising a horizontally disposed support member held by said lifting means in a fixed position relative thereto, a pair of forwardly extending substantially parallel jaw members freely slidably mounted on said support member, said jaw members having outwardly flared end portions for engaging and guiding a post therebetween, power-actuated mechanism for moving said jaw members toward and away from each other mounted on said support member, said mechanism including means for holding said jaw members in spaced relation during movement on initial post contact, said mechanism arranged to move said jaw members together during sliding movement along said support whereby a post is centered between said jaw members and equal pressure is applied thereby against opposed portions of said post, said mechanism being additionally arranged to apply a gripping movement to said jaw members, and means mounted on said jaw members including complementary opposed gripping surfaces of greater length than the jaw thickness.

9. The apparatus of claim 8 in which said means mounted on said jaw members includes a pair of sheet metal plates having inwardly opening concave portions, which concave portions of the pair of plates are directly opposed to each other when attached to the pair of jaw members.

References Cited in the file of this patent

UNITED STATES PATENTS

| | | |
|---|---|---|
| 1,518,561 | Carroll | Dec. 9, 1924 |
| 2,727,779 | Phillips | Dec. 20, 1955 |
| 2,746,630 | Sinclair | May 22, 1956 |
| 2,795,346 | Farmer | June 11, 1957 |